Sept. 25, 1945.    G. B. DAVIS, JR    2,385,694
COFFEE MAKER
Filed June 26, 1944    5 Sheets-Sheet 2

Inventor
George B. Davis Jr.

Sept. 25, 1945.   G. B. DAVIS, JR   2,385,694
COFFEE MAKER
Filed June 26, 1944   5 Sheets-Sheet 3

Inventor
George B. Davis

Sept. 25, 1945. G. B. DAVIS, JR 2,385,694
COFFEE MAKER
Filed June 26, 1944 5 Sheets-Sheet 5
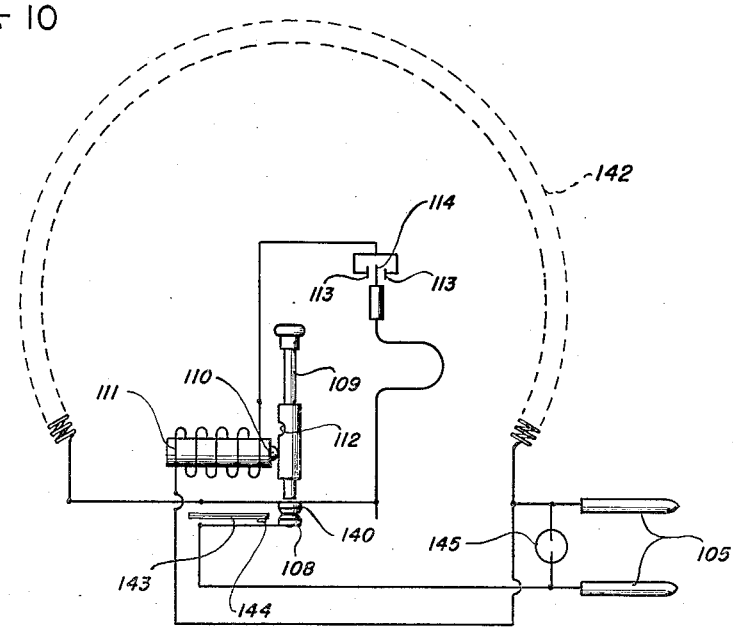
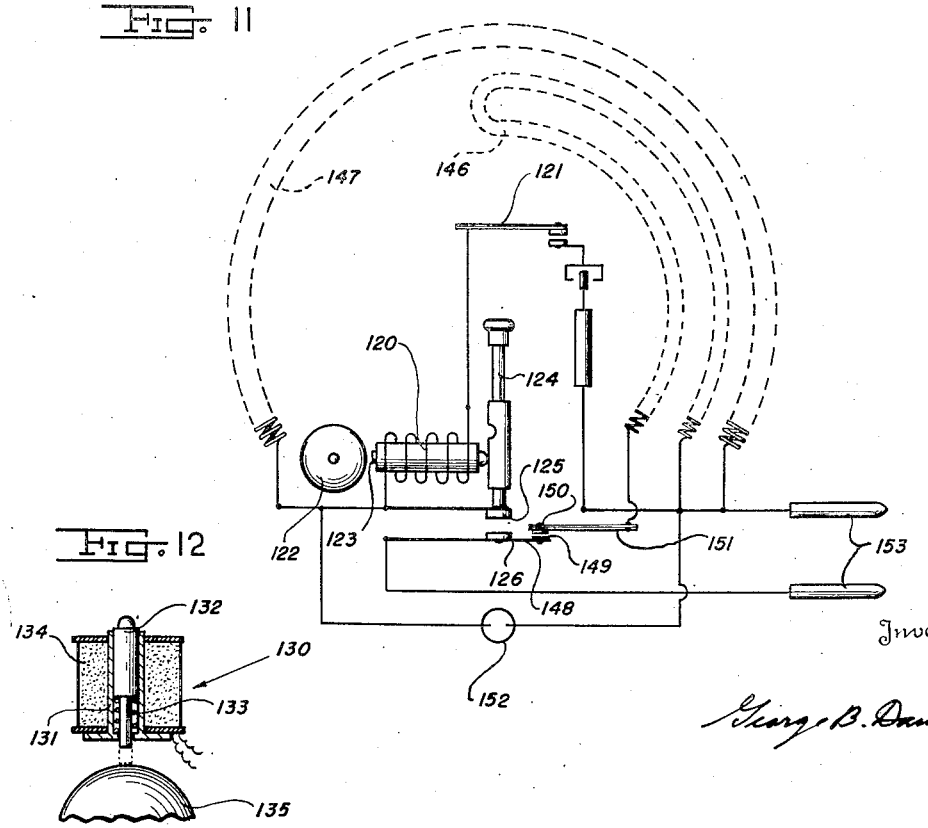
Inventor
George B. Davis Jr.

Patented Sept. 25, 1945

2,385,694

UNITED STATES PATENT OFFICE 2,385,694

COFFEE MAKER

George B. Davis, Jr., Green Acres, Md.

Application June 26, 1944, Serial No. 542,117

8 Claims. (Cl. 99—281)

This invention relates to a coffee maker and more specifically to an automatic coffee maker of the vacuum type.

These coffee makers are provided with coffee steeping and water heating vessels which are in liquid communication with each other.

In coffee makers of this type, it is the usual practice to cut off the heat manually as soon as the water has been transferred from the water heating receptacle to the steeping receptacle. This invention has as one of its objects the provision of an improved control for the type of coffee maker described which renders it completely automatic after the heat has been turned on.

Heretofore, beverage brewers and coffee makers of this type have found considerable favor with the people, but frequently, due to inattention, the user does not properly shut off the power, supplying heat to the device, thereby permitting the lower chamber to run dry. Various methods have been employed to overcome this disadvantage, one of which utilizes the shifting weight caused by the liquid being transferred from the lower vessel into the upper vessel; another provides a thermal control for fitting to or in the upper bowl to be actuated by the presence of the heated liquid forced into the container. Most methods depend for their functioning upon specially constructed containers adapted specifically to their particular control. An object of this invention is to provide a control responsive to the vibration or bouncing action, a functional characteristic of this type of coffee maker; that is, during the latter part of the brewing operation when the steam or vapor is being forced from the lower vessel up by the filter and through the water which has been transferred to the steeping vessel, there is a distinct shaking and bouncing of the vessels caused by this escaping gas which, if applied to a vibrative element, is sufficiently great to operate the control for cutting off the heat supply, permitting the brew to return to the heating vessel.

Another object of this invention is to provide a manually or automatically functional control for the purpose described which is completely concealed in a base support and adaptable for use with any standard coffee maker of the type designated and which will function consistently irrespective of the quantity or temperature of the liquid used and to include means for signaling the time of its automatic functioning.

In order that this invention may be more readily understood, reference is made to the accompanying drawings:

Fig. 10 is an alternate circuit diagram of the invention.

Fig. 11 is an alternate circuit diagram of the invention.

Fig. 12 is a section through a solenoid.

Figure 1:
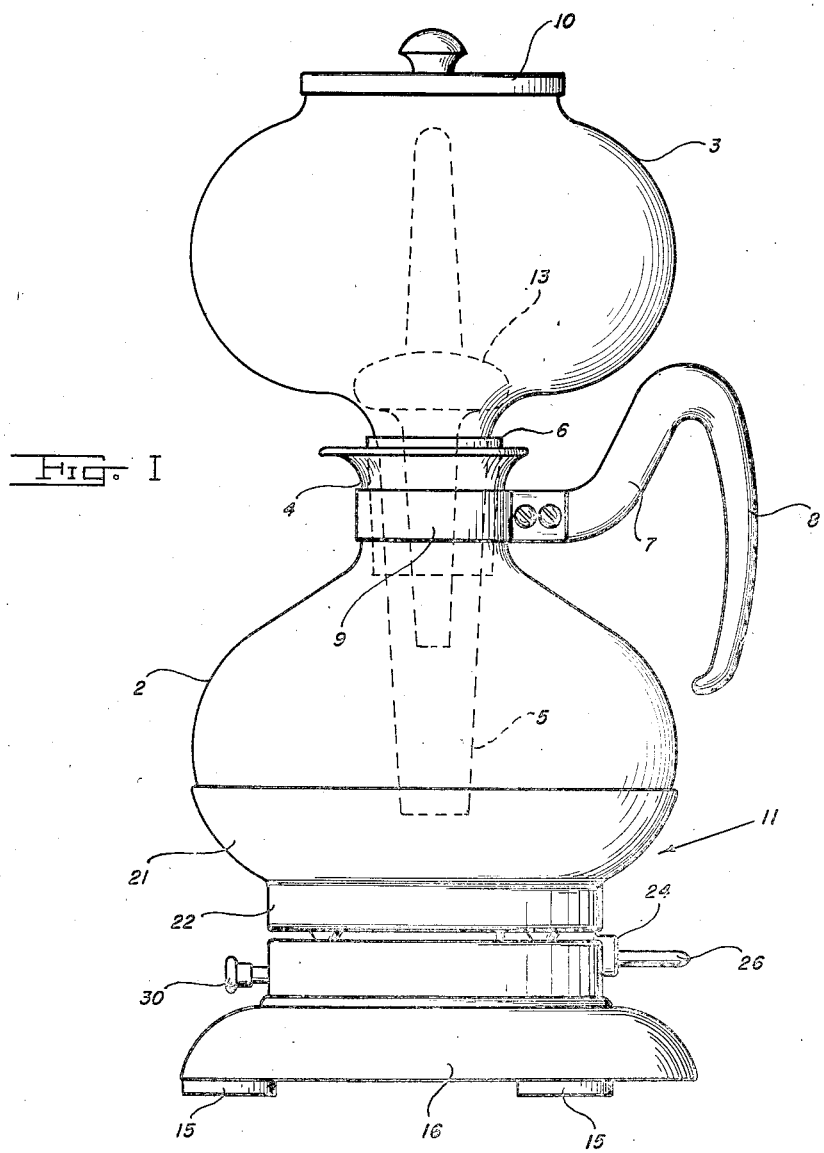
Fig. 1 is an elevational view of a coffee maker as hereafter described.

In reference to Fig. 1 this invention is shown as applied to a coffee maker comprising a lower water heating vessel or bowl 2 and an upper coffee infusion or steeping vessel or bowl 3. The lower bowl 2 is provided at its upper portion with an upright neck 4 within which depends the tubular extension 5 which is attached to the lower portion of the upper bowl 3. The extension 5 constitutes a liquid passage way placing the said bowls 2 and 3 in liquid communication.

A suitable gasket or stopper 6, preferably formed of rubber, is inserted in the neck 4 of the lower bowl and is provided with a centrally arranged aperture to receive the extension 5 provided on the upper bowl. The handle 7 is attached to the lower bowl as shown. This handle comprises a hand-grasping portion 8 and a strap portion 9 which surrounds and grips the neck 4 of the lower bowl. The upper bowl is normally covered by a suitable cover member 10. The support or stand 11 houses a suitable electric heating element and mechanism for controlling the current to the element. This current is supplied through terminal pins 26 which are arranged to receive the usual supply plug of an ordinary supply cord.

In the operation of this apparatus, thus far described, it will be understood that coffee grounds will be placed in the infusion receptacle 3 above the filter 13 and that a suitable quantity of water will be placed in the lower bowl 2, heat will then be applied by the heating element. As the water in the lower bowl is heated a pressure is generated sufficiently great to cause the water in the lower bowl to be forced up through the tube 5 and by or through the filter 13 into the upper bowl 3 where the coffee grounds are placed. As long as heat is applied to the lower bowl the water will continue to flow up into the upper bowl until all of the water in the lower bowl, above the level of the lower end of the tube 5, has risen to the upper bowl. The water will remain in the upper bowl to infuse the coffee until the heat is cut off, this permits the lower bowl to cool allowing the water vapor in the lower bowl to condense and thereby reduce the pressure therein sufficiently to cause the coffee brew in the upper bowl to flow down in the lower bowl through the coffee grounds and filter 13 by atmospheric pressure and gravity. After the coffee has been made, the upper bowl may be removed and the coffee brew poured from the lower bowl by means of the handle.

Figure 2:
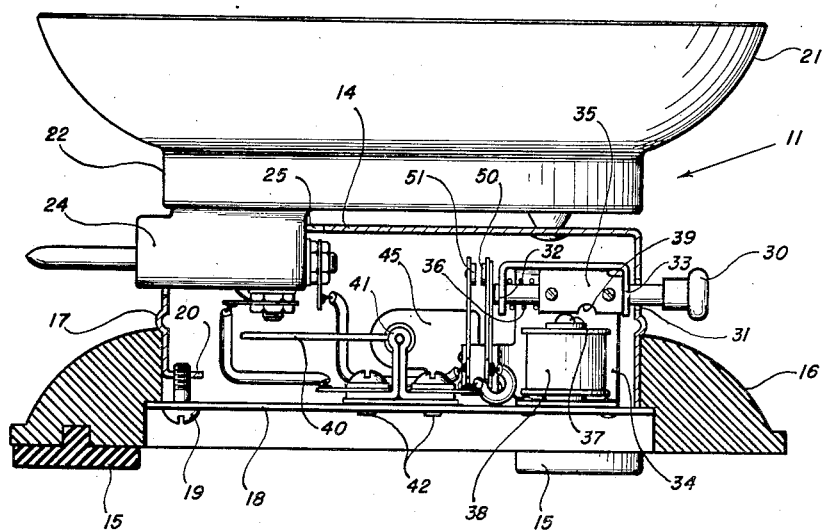
Fig. 2 is a section of the support or stand.
Figure 3:
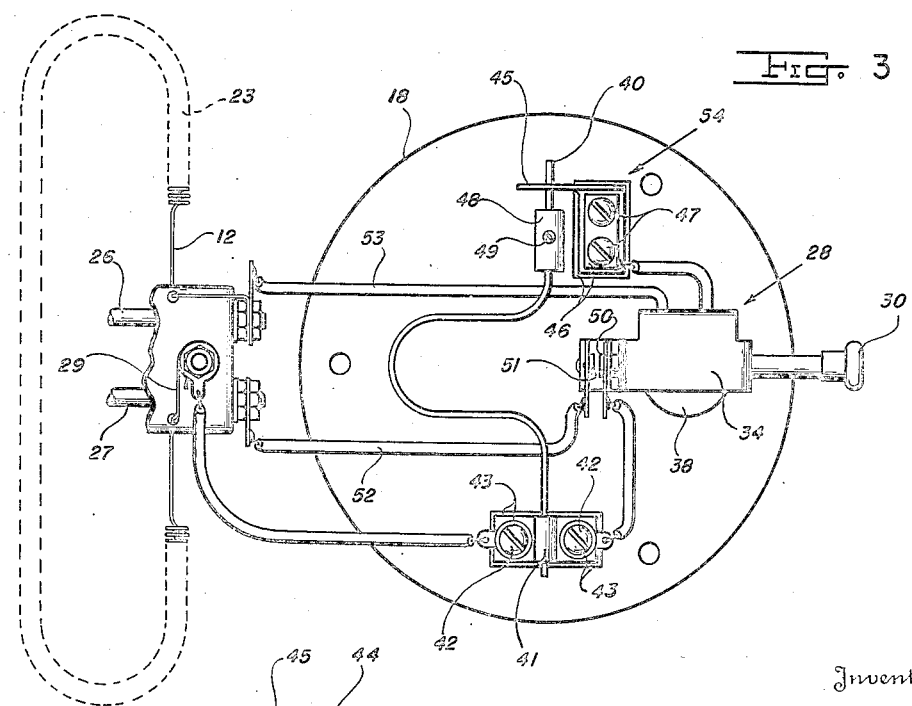
Fig. 3 is a circuit and plan view of the mechanism as shown in Fig. 2.
Figure 4:
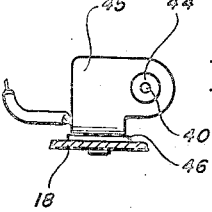
Fig. 4 is an end view of the vibratory contact as shown in Fig. 3.

In reference to Figs. 2-4, inclusive, the support 11 is shown as comprising a base portion or housing 14 resiliently mounted on rubber feet 15 which are set in the plastic ring 16. This plastic ring is held in position between the rib 17 and the base plate 18 which is secured to the housing by screws 19 threaded into the ears 20 as shown. The top portion 21 of the support 11 is formed to the contour of the water heating vessel 2, the lower portion 22 serves to house the heating element 23 which is suitably arranged in an insulating ceramic plate, portion 24 of which, extends downward into the housing through the opening 25 and serves as a support for the terminal pins 26 and 27. Mounted on the base plate 18, the control 28 is positioned so that the set pin 30 will extend beyond the outer edge of the housing 14 through opening 31 and with clearance to operate in its "in" and "out" positions. This pin 30 is slidably mounted in apertures formed in the ears 32 and 33 of the chassis 34 and held in place by collar 35 which has been inserted over the pin and secured in place as shown.

The spring 36 is loaded between ear 32 and collar 35 and operates to keep the pin normally in an outward extended, or off, position. The catch or armature 37 of the magnet or solenoid 38 is elastically actuated for thrusting it upward to engage the notch 39 formed in the collar 35 when the pin 30 is in a retracted position. This pin may be withdrawn manually for cutting off the current when desired.

The oscillating contact member 40 is rigidly secured at one end to the stand piece 41 which is in turn fastened to the plate 18 by screws 42. Insulating washers 43 electrically insulate the said stand 41 from the plate 18. The other end of the vibrating contact arm is suspended within the opening 44 formed in the stationary contact 45 and positioned for electrically connecting with the latter when vibrated or flexed to the necessary degree. This said stationary contact is secured to the plate 18 by screws 47 but electrically insulated therefrom and from the plate by washers 46. The weight 48 is slidable over the member 40 and fastened at the desired position by screw 49.

To set in operation the apparatus thus far described, the set pin 30 of the control 28 is manually forced inward from the outward or "off" position, this action compresses the spring 36 until the detent or latch 37 of the solenoid 38 has engaged the notch 39 to lock the said pin 30 in the retracted or "on" position. This inward movement of the pin forces the spring mounted contact 50 into circuit closing engagement with the contact 51 permitting current flowing in through the contact pin 27 to pass on to the terminal 29 of the heating element 23. The other terminal 12 of the heater connects directly with the other contact pin 26 completing the circuit through the element 23 causing it to heat. The hot element boils the water in the aforementioned water heating vessel, and, as formerly explained, causes the greater portion of this heated water to be forced from the lower vessel into the upper or steeping vessel by the internal pressure generated within the lower vessel; it is at this time that the escaping gases, still being generated in the heating vessel, force an escape through the suspended liquid in the steeping vessel causing a turbulence in the mass of liquid which vibrates and bounces the containers sufficiently to set up a vibration in the resilient contact arm 40. The movement of this contact arm is augmented by the movement of the containers until after a few seconds of this motion it is vibrating to the extent of engaging with its related stationary contact; this connection closes a shunting circuit across the terminals 52 and 53 through the solenoid 38 which, on being energized, retracts the armature or latch 37, releasing the set pin 30 which snaps out to its "off" position and in so doing breaks the circuit through the entire mechanism. As the heating element cools, the coffee in the upper or steeping vessel is drawn back into the water heating vessel by the internal pressure drop therein and the brewing cycle is complete.

Figure 5:
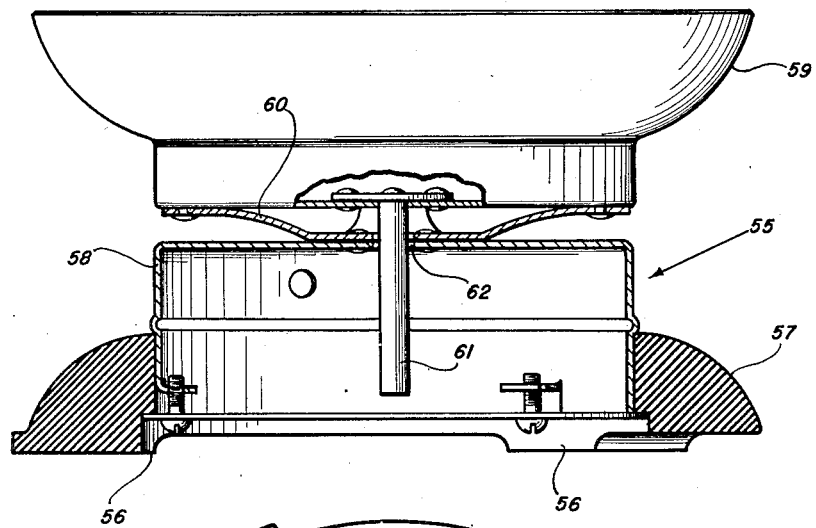
Fig. 5 is a section through an alternately constructed housing.
Figure 6:
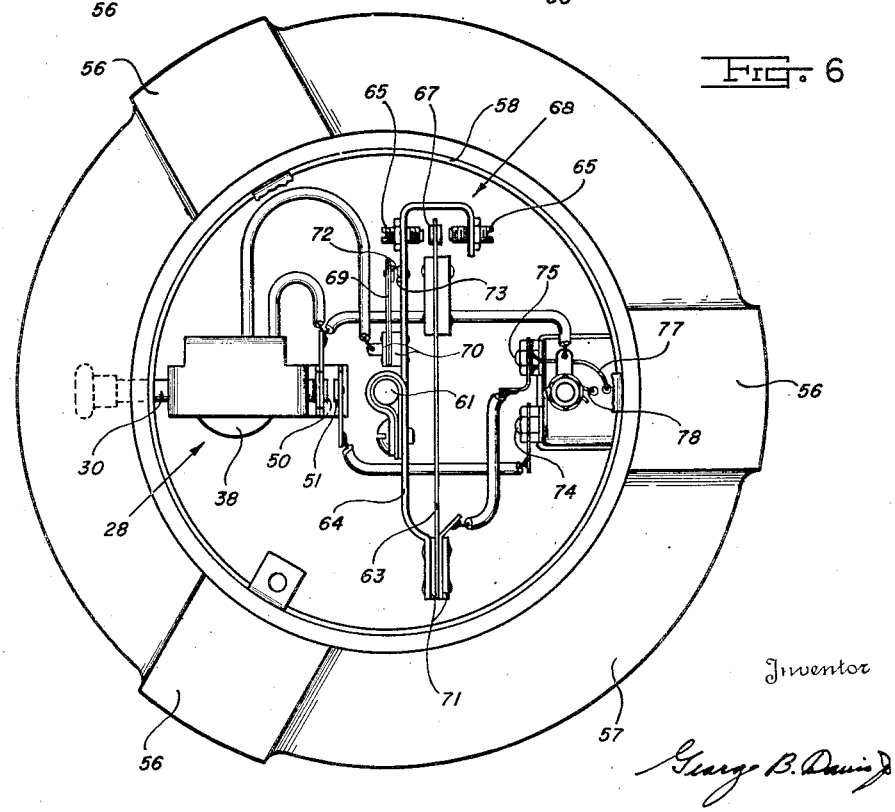
Fig. 6 is a base view of the mechanism assembled in the housing as shown in Fig. 5 after rotating the housing counter-clock-wise 30°.

In referring to Figures 5-6, inclusive, an alternate and more sensitive type of stand and mechanism is shown. The base portion 55 of the stand is rigidly supported by feet 56 formed in the plastic ring 57 which is secured to the housing 58 in the same manner as shown in Fig. 2. The top portion 59 of the support is adapted to receive a water heating vessel and also provides space for a heating element to be arranged beneath the vessel. This said top portion of the support is resiliently mounted on the housing 58 by means of spring 60. The pendant 61 is rigidly affixed to the top portion of the support and provides means whereby the movement of this top portion 59 may be communicated down into the housing 58 through the opening 62.

The base view of the support shows an alternate mechanism assembled within the housing. The control 28 herein is the same as formally described. The vibrative control 68, instead of being attached to the base, is rigidly secured to the pendant 61 by means of bar 64. This bar is formed at one end, as shown, for receiving the adjustable contacts 65 positioned to engage the contacts 67 of the vibrating or oscillating member 63 when it is moved to a predetermined degree. Washers 71 insulate the oscillating arm 63 from the bar 64. The bimetal member 69 is electrically insulated from the bar 64 by washers 70, but adapted to contact the bar by bringing together points 72 and 73 when heated to a predetermined temperature. Current is supplied to the mechanism through supply pins 74 and 75. The terminals 77 and 78 of the heating element are brought into circuit by bringing together contacts 50 and 51 of the control 28. The solenoid 38 of the control connects with the two supply pins 74 and 75 through a shunt circuit normally open at contacts 65 and 67 and the thermally controlled contacts 72 and 73.

In the operation of this variation of the invention, the pin 30 is set at the "on" or "in" position, as heretofore described, to close the switch of the control 28 which completes the circuit to the terminals 77 and 78 of the heating element. The element thus energized will apply heat to the water heating vessel, and, by conduction, principally through the pendant 61, raise the temperature of the thermal member 69 causing it to bend inward to bring together contacts 72 and 73 to further close the circuit to the control 28. The boiling of the water in the heating vessel will cause a vibration of the member 63 sufficiently great as to bring together contacts 65 and 67 to complete the circuit through the solenoid 38 causing it to release the set pin 30 which returns to its extended or "off" position and in so doing breaks the circuit through the mechanism by separating the contacts of the control switch 28. The advantage of this construction is that any premature jolting or shaking during the placing or setting up of the coffee maker will not affect the control until after the thermal strip 69 has been heated to the desired degree, which is set to take place only during the latter stages of the coffee brewing process, that is, when the water nears the boiling point, for at that time it is very unusual for the coffee maker to be disturbed. This thermal safety control may be included in any of the circuits herein described.

Figure 7:
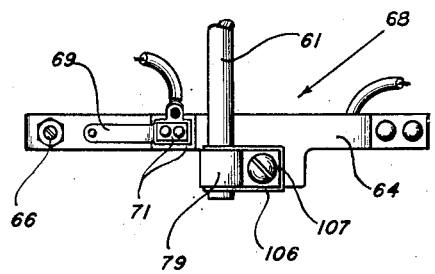
Fig. 7 is a side elevational view of the vibratory control assembly as used in Fig. 6.

Fig. 7 is a side view of the control 68 as shown in Fig. 6 with the fastening strap 79 fabricated from the strip 64 for securing the mechanism to the pendant 61 by the application of screw 107. The insulating piece 106 electrically insulates the strip 64 from the said pendant.

Figure 8:
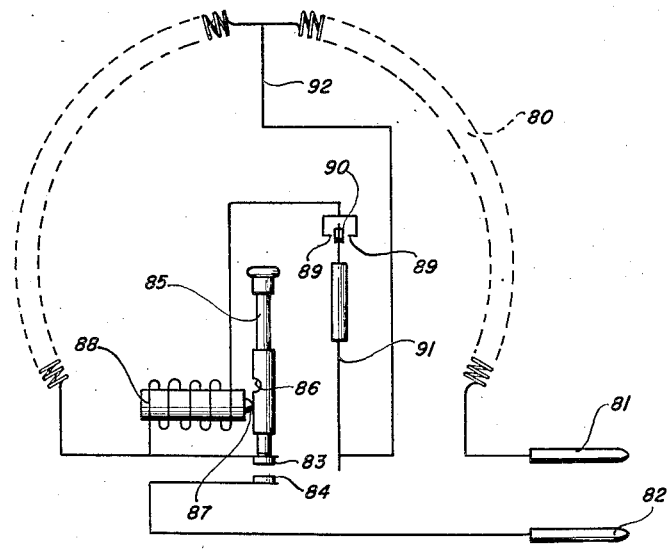
Fig. 8 is one form of circuit diagram of the invention.

In the circuit diagram as shown in Fig. 8, the heating element 80 is energized by current supplied through terminal pins 81 and 82 after the contacts 83 and 84 have been forced together by the downward movement of the set pin 85. This pin is held in the down position by the engagement of notch 86 with the armature or latch 87 of the solenoid 88. The solenoid 88 is energized for retracting the armature and releasing the pin 85 by bringing together points 89 and 90 by the vibrator 91. By releasing the pin 85 the contacts 83 and 84 are permitted to separate thus breaking the circuit to the entire mechanism. As is shown, the conductor 92 may be connected to the element 80 at any point desired for reducing the voltage to conform with the type of solenoid used.

Figure 9:
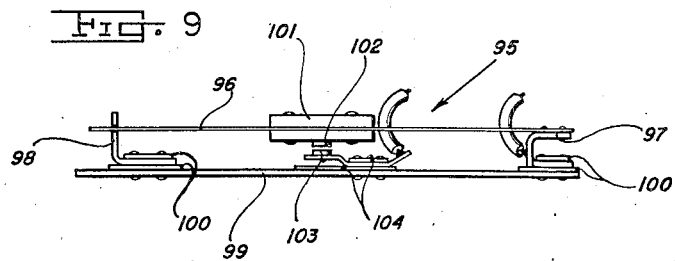
Fig. 9 is a side elevational view of an alternate form of vibratory control assembly.

In Fig. 9 is shown an alternate construction for a vibrator control which may be used in any of the assemblies. The vibrative switch arm 96 of the control 95 is shown supported at either end, rigidly affixed to the stand 97 at one end and slidably supported at the other end by stand 98, both of these stands are insulated from the base 99 by washers 100. The weight 101 affixed to the vibrative arm 96 holds the contact 102 in position for electrically engaging the stationary contact 103 when the arm is set in motion. The stationary contact 103 is electrically insulated from the base by washers 104. If desired the weight 101 may be positioned within the effective range of the magnetic attraction of the magnet or solenoid so that any engagement of the oscillating contact 102 with the stationary contact 103 will energize the magnet for holding these contacts together until the latch of the control has been released.

Fig. 10 shows a form of hookup which may be used in the assembly formerly described and shown. The current for the assembly is supplied through terminal pins 105. The element 142 is energized through the contacts 108 and 140 of the control. The pin 109 is held in its down position by the latch or armature 110 which engages the notch 112 of the pin when in position. The set pin 109 remains in this position until released by the retracting of the armature 110 which occurs when the solenoid 111 is energized by the closing of the shunt circuit through the vibrator; that takes place when the contact 114 of the vibrator engages one of the contacts 113. As can be seen, this hookup differs from the foregoing in that the element 142 is normally in circuit through contacts 108 and 140. The thermal strip 143 is positioned for intermittently forcing the arm 144 with its contact 108 out of engagement with contact 140 to periodically break the circuit when the control pin 109 is up or in its "off" position. This operation is desirable for keeping the liquid warm after the control has functioned to return the coffee from the steeping vessel to the heating vessel. The downward movement of the set pin 109 against the contact 140 also forces the arm 144 out of the operating range of the bimetal strip 143; this prevents the strip from having any effect on the heating element until the pin has been released. The neon glow lamp 145 across the terminals indicates when the element is energized.

The hookup as shown in Fig. 11 provides for an auxiliary low watt or warming element 146 to be automatically connected, as the main or heating element 147 is cut off at the completion of the brewing process. The warming element emits only enough heat to keep a liquid in the water heating vessel warm until used. A visible signal is provided for indicating when the heating element is energized. An audible signal indicates when the brewing process is complete and the warming element has been connected. In the operation of this hookup, the pin 124 is manually forced down to be locked in this downward position by the armature 123. The movement of this pin presses contact 125 against contact 126 to bend the arm 148 backward, forcing contact 149 farther from the contact 150 of the thermal arm 151. This operation has closed the circuit through the heating element 147 causing it to heat, at the same time lighting the neon glow lamp 152 to signal the operation of the device. The heat from the energized element acts on the thermal strip 151 bending it downward in position for connecting with the contact 149 when the pin allows arm 148 to move up to engage the downward bent strip 151 for connecting the warming element 146. The heat from the warming element is sufficient to maintain the said strip in its bent, circuit closing position until the power source to pin 153 is interrupted, allowing the element to cool, permitting the strip with contact 150 to move out of engagement with the contact 149, this opens the circuit to the assembly until the pin 124 has been manually forced down to connect the heating element 147 as heretofore described.

Fig. 12 shows a section through a magnet or solenoid 130 which may be used in the control and adapted for signaling the cutting off of the mechanism. Slidably mounted within the core 131 is the armature 132 held in an outward position by spring 133. The energizing of the wire winding 134 causes the armature to be magnetically drawn down against the spring with such violence that it overtravels its normal retracted position to engage the bell 135 to signal the time of cut-off.

Various other modifications in construction and assembly may be resorted to within the spirit and scope of this invention. What I therefore claim and desire to secure by Letters Patent is:

1. A coffee maker comprising a water heating vessel, a coffee steeping vessel in liquid communication with said water heating vessel, a resilient support for said vessels including means for heating said water heating vessel, a control device for said heating means, and operating means for the control device responsive to a vibration of said resilient support.

2. A coffee maker comprising a water heating vessel, a coffee steeping vessel in liquid communication with said water heating vessel, a resilient support for said vessels, a heating element arranged in said support in combination with a circuit control having an operative position and a cut-off position, means responsive to a vibration of the resilient support to cause the said control to move from its operative to its cut-off position.

3. A coffee maker comprising a water heating vessel, a coffee steeping vessel in liquid communication with said water heating vessel, a support for said vessels including a vessel receiving top portion resiliently yieldable to a base portion adapted to be set upon a surface support, a heating element arranged in said support in combination with a circuit controller having an operative position and a cut-off position, means responsive to a vibration of the resilient top portion of the support to cause the said control to move from its operative to its cut-off position.

4. A coffee maker comprising a water heating vessel, a coffee steeping vessel in liquid communication with said water heating vessel, a support for said vessels including a resiliently yieldable top portion, a base portion, means within said top portion for electrically heating said heating vessel, a switch within said base portion connected to control said heating means, said switch being biased toward open circuit position, a catch for retaining said switch in closed circuit position, electro-magnetic means adapted to release said catch when energized by a control yieldable with said top portion of said support and operable by a vibration of said vessels.

5. A claim as claimed in claim 2 with the said control including thermal means for rendering it inoperative until the said top portion of the support has attained a predetermined temperature.

6. A coffee maker comprising a water heating vessel, a coffee steeping vessel in liquid communication with said water heating vessel, a resiliently mounted support for said vessels, an electric heating element disposed in said support, a circuit for energizing said electric heating element in which is interposed a switch for manually closing said circuit, a latch for maintaining said circuit in closed position, an electro-magnet adapted to release said latch when energized by a control responsive to a vibration of the resiliently mounted support.

7. A coffee maker comprising a first vessel for heating water, a second vessel for infusing coffee, a liquid transfer tube between said vessels, heating means for applying heat to said first vessel, control means for said heating means for causing it to apply heat to said first vessel at a high rate to heat the water therein so as to cause it to flow through said tube to said second vessel and by said water transfer cause a vibration of said vessels, means receptive of said vibrations and responsive thereto for operating said control to reduce the heat applied to said first vessel when the water therein has been substantially transferred therefrom.

8. A coffee maker comprising a first vessel for heating water, a second vessel for infusing coffee, a liquid transfer tube between said vessels, heating means for applying heat to said first vessel, control means for said heating means for causing it to apply heat to said first vessel at a high rate to heat the water therein so as to cause it to flow through said tube to said second vessel and by said water transfer cause a vibration of said vessels, means receptive of said vibrations and responsive thereto for operating said control for shutting off the heat applied to said first vessel when the water therein has been substantially transferred therefrom, and an auxiliary control means for said heating means operable responsively to the temperature thereof so as to control the heating means to apply a temperature maintaining heat to said first vessel when said heating means has cooled to a predetermined low temperature.

GEORGE B. DAVIS, JR.